United States Patent
Farrett

Patent Number: 5,636,325
Date of Patent: Jun. 3, 1997

[54] SPEECH SYNTHESIS AND ANALYSIS OF DIALECTS

[75] Inventor: Peter W. Farrett, Austin, Tex.

[73] Assignee: International Business Machines Corporation, Armonk, N.Y.

[21] Appl. No.: 176,819

[22] Filed: Jan. 5, 1994

Related U.S. Application Data

[63] Continuation of Ser. No. 976,151, Nov. 13, 1992, abandoned.

[51] Int. Cl.$^6$ ................................................ G10L 9/00
[52] U.S. Cl. .................. 395/2.67; 395/2.4; 395/2.69; 395/2.76; 395/2.77
[58] Field of Search ................ 381/29–53; 395/2, 395/2.2, 2.4, 2.55, 2.6, 2.67, 2.69, 2.76, 2.77; 360/135

[56] References Cited

U.S. PATENT DOCUMENTS

| | | | |
|---|---|---|---|
| 4,455,615 | 6/1984 | Tanimoto et al. | 395/2 |
| 4,613,944 | 9/1986 | Hashimoto et al. | 395/2 |
| 4,624,012 | 11/1986 | Lin et al. | 381/51 |
| 4,692,941 | 9/1987 | Jacks et al. | 381/52 |
| 4,802,223 | 1/1989 | Lin et al. | 381/38 |
| 4,833,718 | 5/1989 | Sprague | 381/52 |
| 4,852,170 | 7/1989 | Bordeaux | 381/50 |
| 4,896,359 | 1/1990 | Yamamoto et al. | 381/52 |
| 4,908,727 | 3/1990 | Ezaki et al. | 360/135 |
| 4,980,917 | 12/1990 | Hutchins | 381/41 |
| 5,029,211 | 7/1991 | Ozawa | 381/36 |
| 5,113,449 | 5/1992 | Blanton et al. | 381/51 |
| 5,133,010 | 7/1992 | Borth et al. | 381/38 |

OTHER PUBLICATIONS

"Synthesis by Rule: LPC Diphones and Calculation of Formant Trajectories", Xavier Rodet and Philippe Depalle Ircam, 1985 IEEE, pp. 736–739.

*Primary Examiner*—Allen R. MacDonald
*Assistant Examiner*—Robert Mattson
*Attorney, Agent, or Firm*—Jeffrey S. LaBaw

[57] ABSTRACT

A set of intonation intervals for a chosen dialect are applied to the intonational contour of a phomene string derived from a single set of stored linguistic units, e.g., phonemes. Sets of intonational intervals are stored to simulate or recognize different dialects or languages from a single set of stored phonemes. The interval rules preferably use a prosodic analysis of the phoneme string or other cues to apply a given interval to the phoneme string. A second set of interval data is provided for semantic information. The speech system is based on the observation that each dialect and language possess its own set of musical relationships or intonation intervals. These musical relationships are used by a human listener to identify the particular dialect or language. The speech system may be either a speech synthesis or speech analysis tool or may be a combined speech synthesis/analysis system.

42 Claims, 7 Drawing Sheets

| NOTES | FIRST OCTAVE (HZ) | SECOND OCTAVE (HZ) | THIRD OCTAVE (HZ) |
|---|---|---|---|
| C | 66 | 131 | 262 |
| C# | 69 | 139 | 277 |
| D | 74 | 147 | 294 |
| D# | 78 | 156 | 311 |
| E | 83 | 165 | 330 |
| F | 87 | 175 | 349 |
| F# | 93 | 185 | 370 |
| G | 98 | 196 | 392 |
| G# | 104 | 208 | 416 |
| A | 110 | 220 | 440 |
| A# | 117 | 233 | 466 |
| B | 124 | 247 | 494 |

FIG. 5A

| INTERVALS | EXAMPLE INTERVAL | APPROX FREQUENCY RATIO |
|---|---|---|
| MINOR 2ND (m2) | C-C# | 1:1.06 |
| MAJOR 2ND (M2) | C-D | 1:1.12 |
| MINOR 3RD (m3) | C-D# | 1:1.18 |
| MAJOR 3RD (M3) | C-E | 1:1.26 |
| PERFECT 4TH (P4) | C-F | 1:1.33 |
| PERFECT 5TH (P5) | C-G | 1:1.50 |
| MINOR 6TH (m6) | C-G# | 1:1.59 |
| MAJOR 6TH (M6) | C-A | 1:1.68 |
| MINOR 7ND (m7) | C-A# | 1:1.78 |
| MAJOR 7ND (M7) | C-B | 1:1.89 |
| OCTAVE (8VA) | C-C | 1:2 |

FIG. 5B

DIALECT TABLE

| DIALECT | INTERVAL, TIME, RISING OR DESCENDING |
|---|---|
| BRITISH ENGLISH | $BI_1, T_1, R; BI_2, T_2 R; BI_3, T_3, D; \ldots$ |
| JAPANESE | $JI_1, T_1, R; JI_2, T_2, R; JI_3, T_3, D; \ldots$ |
| IRISH | $II_1, T_1, R; II_2, T_2, D; II_3, T_3, R; \ldots$ |
| MID-WESTERN (US) | $MI_1, T_1 R; MI_2, T_2, R; MI_3, T_3, R; \ldots$ |

SEMANTIC TABLE

| SENTENCE TYPE | INTERVAL, TIME, RISING OR DESCENDING |
|---|---|
| QUESTION | $QI_1, T_1 R; QI_2, T_2, R; \ldots$ |
| EXCLAMATION | $EI_1, T_1, R; EI_2, T_2, R; \ldots$ |
| PARAVERBAL | $PI_1, T_1, R; PI_2, T_2, R; \ldots$ |

FIG. 6

. Seven silly suesses sew Sue's socks,
whose socks does Sue sew?

|PE period | $P_S$ | $T_{SE}$ | $P_E$ | $T_{EV}$ | $P_V$ | $T_{VE}$ | $P_E$ | $T_{EN}$ | $P_N$ |...

| S | $P_S$ | $T_{SO}$ | $P_O$ | $T_{OK}$ | $P_K$ | $T_{KS}$ | $P_S$ | PEcomma | S |

|KW whose | $P_H$ | $T_{Hu}$ | $P_u$ | $T_{us}$ | $P_s$ | ... | $P_s$ | $T_{s\bar{o}}$ | $P_{\bar{o}}$ |

|PE question |

FIG. 6A

SPEECH SYNTHESIS AND ANALYSIS OF DIALECTS

This is a continuation of application Ser. No. 07/976,151 filed Nov. 13, 1992, now abandoned.

BACKGROUND OF THE INVENTION

This invention generally relates to improvements in speech synthesis and analysis. More particularly, it relates to improvements in handling a plurality of dialects in a speech I/O system having a single set of stored phonemes.

BACKGROUND OF THE INVENTION

There has been substantial research in the field of text-to-speech or speech-to-text input/output (I/O) systems in the past decades. Yet, analyzing, synthesizing and coding human speech has proven to be a very difficult problem whose complete solution has continued to elude researchers and engineers. The complexity of the frequency spectrum of phonemes in speech, the number of different phonemes in the same language, the number of different dialects and languages and the variety of ways the sounds are formed by different speakers are all factors which add to the problem. For a speech program, it is difficult to either identify a string of phonemes spoken continuously by a random human speaker or to synthesize speech from a set of phonemes which will be identified as a set of words by those hearing them.

Most text-to-speech conversion systems convert an input text string into a corresponding string of linguistic units such as consonant and vowel phonemes, or phoneme variants such as allophones, diphones, or triphones. An allophone is a variant of the phoneme based on surrounding sounds. For example, the aspirated "p" of the word "pawn" and the unaspirated "p" of the word "spawn" are both allophones of the phoneme "P". Phonemes are the basic building blocks of speech corresponding to the sounds of a particular language or dialect. Diphones and triphones are concatenations of phonemes and are related to allophones in that the pronunciation of each of the phonemes depend on the other phonemes, diphones or triphones. Two techniques, "synthesis by rule" or linear predictive coding (LPC) or variation thereof are generally used for converting the phonemes into synthetic speech. Other speech synthesis and analysis techniques are known to the art.

For a speech synthesis system, a text string is the initial input which is parsed into individual words and punctuation characters. Generally, a dictionary lookup is performed for those words which do not follow the standard system rules of pronunciation to convert the text of these words to a set of phonemes or other linguistic units. The remainder of the text is converted to a set of phonemes according to the text to phonemes rules.

Transitions between the individual phonemes in the phoneme string developed from the dictionary lookup and text-to-phoneme conversion must be developed if the synthesized speech is not to sound unnaturally discontinuous between one phoneme to the next. It is well known that the pronunciation of a particular phoneme is context dependent, i.e. the pronunciation depends upon what phonemes precede and follow the phoneme. The transitions between at least some phonemes if allophones, diphone or triphones are used as the linguistic unit may be less harsh as the relationship with the surrounding phonemes is part of the linguistic unit. Nonetheless, a more pleasing result will be accomplished if transitions are smoothed between linguistic units. Smoothing the transitions is usually accomplished by choosing a stored transition curve from a table of transitions or by an interpolation technique.

A prosodic routine is included in many prior art text-to-speech systems. These routines determine the duration and fundamental frequency pattern of the linguistics units in the text string, typically on a sentence level. Prosodic routines can be written for other portions of the text string such as phrases. The prosodic analyzer section will identify clauses within text sentences by locating punctuation and conjunctions. Keywords such as pronouns, prepositions and articles are used to determine the sentence structure. Once the sentence structure is detected, the prosody rules can be applied to the phoneme string which resulted from the dictionary lookup and the text to phonemes rules. The parsing of the text string into phonemes and prosody determination steps may be performed in different orders in different speech systems.

The prosody information, phonemes and transitions are converted into formant and pitch parameters. A speech synthesizer uses the parameters to generate a synthetic speech waveform. Formants are used to characterize the successive maxima in the speech spectrum; the first formant ($f_1$) for the lowest resonance frequency, the second formant ($f_2$) for the next lowest resonance frequency, the third($f_3$) formant for the third lowest resonance frequency, etc. Generally, the fundamental pitch, of, and the first three formants, $f_1$, $f_2$ and $f_3$, will be adequate for intelligibility. The pitch and formant data for each phoneme can be stored in a lookup table. Alternatively, the pitch and formant data for large sets of phonemes, allophones, etc. can be efficiently stored using code books of parameters selected using vector quantization methods. An intonational contour will hopefully result which gives the synthesized speech an approximation to the rhythm and melody of human speech.

In a speech recognition system, a digitized audio signal is sampled many times per second to match the signal to code books to identify the individual phonemes which comprise the waveform. Transitions between phonemes and words are determined as well as prosodic information such as the punctuation in the sentences. A phoneme is easily related to an ascii character. The output of a speech recognition system is usually text string, in ascii or other character representation, but can be some other predetermined output. Techniques similar to those used in speech synthesis, e.g., LPC, are used in speech recognition. Indeed many speech systems are combined speech analysis/synthesis systems where a learning process analyzing speech samples is used to generate the code books subsequently used to synthesize speech from a text string. One of the more interesting problems in speech synthesis and analysis is the different dialects and languages in human speech. Yet, regardless of the storage method used, it is obvious that a huge amount of data is required for adequate speech synthesis even for a single voice. When a speech system is to produce or analyze a variety of dialects, the storage and cost problems can be multiplied for each new dialect. For example, some prior art systems use stored speech waveforms generated by a speaker of a desired dialect to produce the synthesized speech. It would be relatively easy to extend such a system for several dialects or other speech characteristics such as male or female by having several sets of waveforms generated by speakers of the dialects the system is to emulate. Storage becomes a problem.

Further, it desirable to efficiently switch from one dialect or language to the next. While it might be possible to produce speech from a first dialect from a first set of waveforms, and then when a second dialect is to be emulated, dump all the first set of waveforms from active memory and load a second set of waveforms given the vast amount of data required, it would not be quickly accomplished. Thus, it would be difficult in such a system given limited memory to simulate more than one dialect at a time.

One prior art speech system teaches that a single set of speech data can be used to generate multiple voices by altering the pitch or formant data according to an algorithm or ratio. The method separates the pitch period, the formants which model the vocal track and the speech rate as independent factors. The voice characteristics of the synthesized speech from the source are then modified by varying the magnitudes of the signal sampling rate, the pitch period and the speech rate or timing in a preselected manner depending on the desired output voice characteristics for the output synthesized speech. This technique is used to change the apparent sex and/or species of the synthesized speaker, but does not address different dialects or languages.

SUMMARY OF THE INVENTION

It is therefore an object of the invention to minimize storage requirements of producing or analyzing speech samples from a plurality of dialects.

It is another object of the invention to produce or analyze speech samples of a plurality of dialects concurrently.

These and other objects and features of the invention are accomplished by applying a set of intonation interval and timing parameters for a chosen dialect from sets of data for a plurality of dialects to a single set of stored linguistic units, e.g., phonemes. The speech system is based on the observation that each dialect and language possess its own set of musical relationships, e.g., intonation intervals. These musical relationships are used by a human listener to identify the particular dialect or language. The speech system may be either a speech synthesis or speech analysis tool or may be a combined speech synthesis/analysis system. After the text string or speech sample has been differentiated into a string of phonemes, a dialect table lookup is performed. In the case of a text string which is to be synthesized into speech, the user or speech system chooses a particular dialect for output. The table lookup extracts the interval and timing information for the selected dialect and applies them to the phoneme string according to interval rules. The interval rules use the prosodic analysis of the phoneme string or other cues to apply a given interval to the phoneme string. A separate semantic table lookup may be performed for semantic information, i.e., relating to punctuation. The semantic interval and timing information found are applied to the phoneme string according to semantic interval rules using the prosodic analysis.

For an analysis of a speech sample in recognition mode, the speech system will compare the speech sample to successive sets of interval and timing information for the various dialects retrieved by a table lookup. Alternatively, the speech system will compare the stored waveform of the captured speech sample to a waveform assembled from the stored phonemes. The differences between the two waveforms are used in the table lookup and compare step to identify the dialect of the speaker.

For speech synthesis, the system also envisions a transition smoothing table lookup. After the best transition curve is chosen from a table of transition curves, a constant may be added to the resulting intonational curve according to the particular phonemes which precede and follow the transition.

BRIEF DESCRIPTION OF THE DRAWINGS

These and other objects and features will become more easily understood by reference with the attached drawings and following description.

FIG. 5A is a table of the frequency values of a portion of the diatonic scale which is used for human speech.

FIG. 5B is a table of intervals in the diatonic scale with their respective frequency ratios.

FIG. 6 is a representation of the lookup table including intervals and timing information for a plurality of dialects.

FIG. 6A depicts a text string and a representation of phonemes, transisitions and prosodic and keyword events to which the text string is parsed.

DETAILED DESCRIPTION OF THE DRAWINGS

Figure 1:
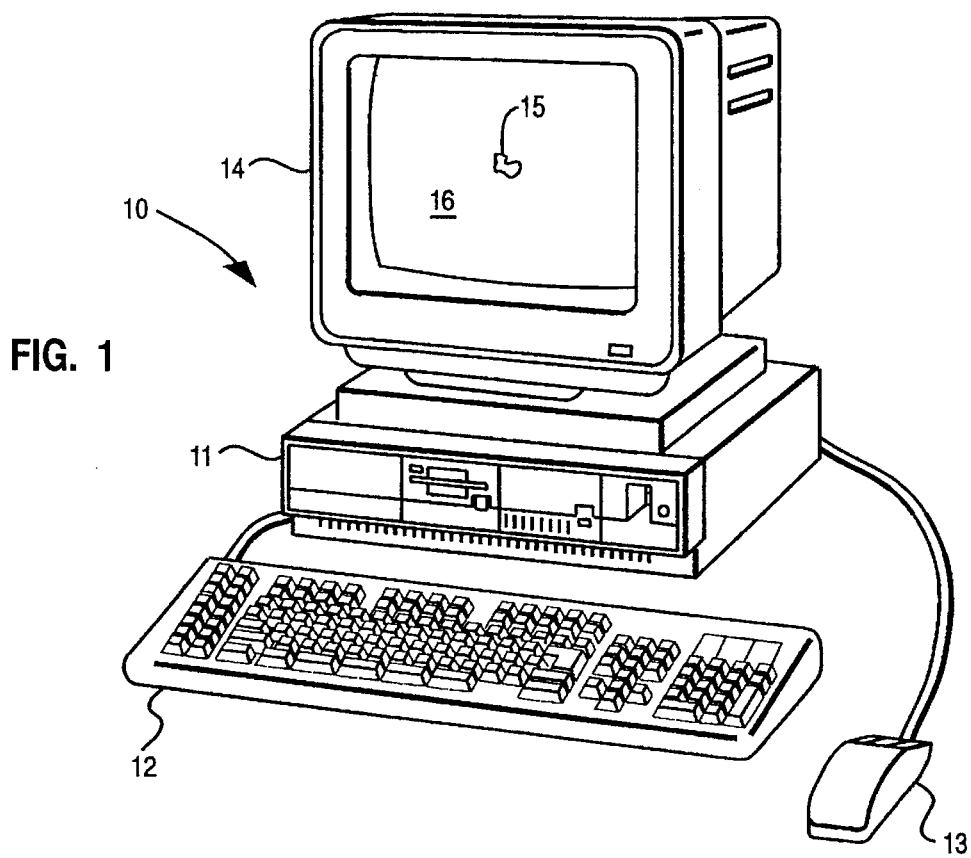
FIG. 1 is a representation of a personal computer system including the system unit, keyboard, mouse and display.

The invention can be implemented on a variety of computer platforms. The processor unit could be, for example, a personal computer, a mini computer or a mainframe computer, running the plurality of computer terminals. The computer may be a standalone system, part of a network, such as a local area network or wide are network or a larger teleprocessing system. Most preferably, however, the invention is described below is implemented on standalone multimedia personal computer, such as IBM's PS/2 series, although the specific choice of a computer is limited only by the memory and disk storage requirements. For additional information on IBM's PS/2 series of computer readers referred to *Technical Reference Manual Personal System/2 (Model 50, 60 Systems)*, IBM Corporation, Part Number 68X2224, Order In FIG. 1, a personal computer 10, comprising a system unit 11, a keyboard 12, a mouse 13 and a display 14 are depicted. The keyboard 12 and mouse 13 are user input devices. The screen 16 of display device 14 is used to present the visual feedback to the user of the results of the computer operations. Typically, the graphical user interface supported by the operating system allows the user to use a point and shoot input method by moving the pointer 15 to icon representing a data object at a particular location on the screen and press one of the mouse buttons to form a user command selection. In the case of this invention, the data object may be an audio speech sample or a speech library comprising a plurality of audio speech signals. Not depicted is the speaker used to produce the synthesized speech which resides in the system unit 11. Alternatively, the synthesized speech could be produced on external speakers coupled to the audio controller 31 (FIG. 2)

Figure 2:
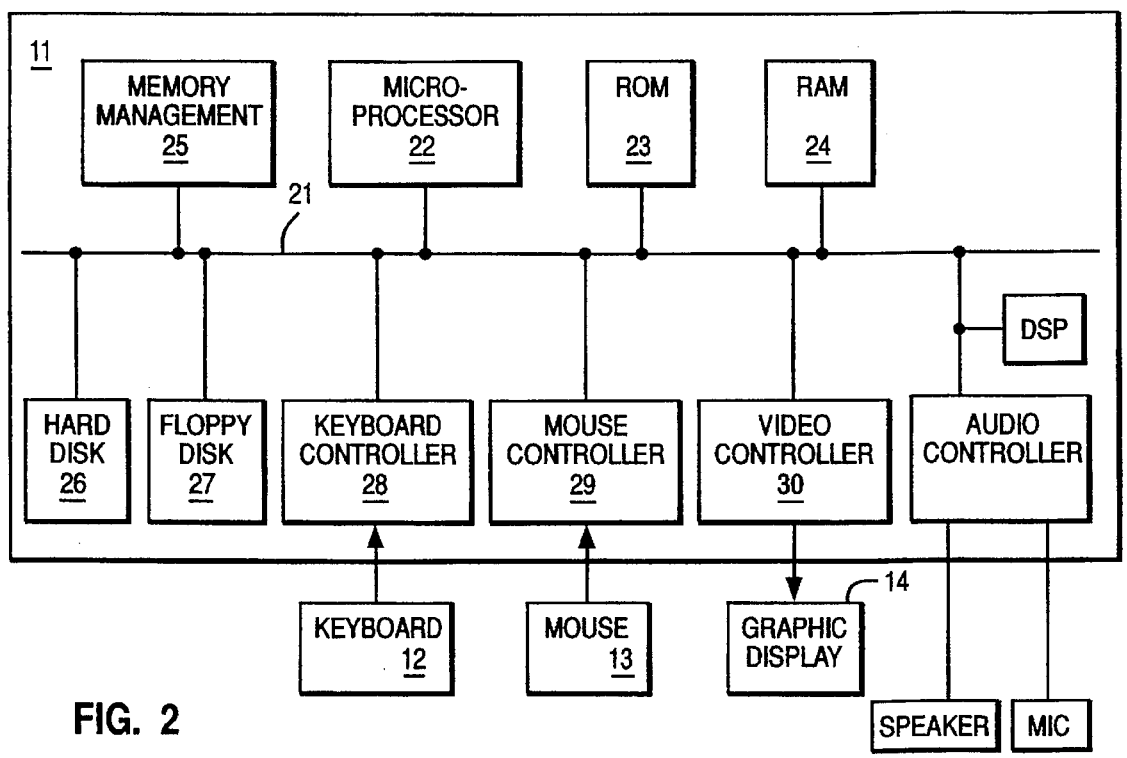
FIG. 2 is a block diagram of the computer system components in FIG. 1.

FIG. 2 shows a block diagram of the components of the personal computer shown in FIG. 1. The system unit 11 includes a system bus or system busses 21 to which various components are coupled and by which communication between the various components is accomplished. A microprocessor 22 is connected to the system bus 21 and is supported by read only memory (ROM) 23 and random access memory (RAM) 24 also connected to system bus 21. The microprocessor 22 in the IBM PS/2 series of computers is one of the Intel family of microprocessors including the 8088, 286, 386 or 486 microprocessors, however, other microprocessors including, but not limited to Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input/Output System (BIOS) which controls basic hardware operations such as the interaction and the disk drives and the keyboard. The RAM 24 is the main memory into which the operating system and speech programs are loaded. The memory management chip 25 is connected to the system bus 21 and controls direct memory access operations including, passing data between the RAM 24 and hard disk drive 21 and floppy disk drive 27. A CD ROM 28 also coupled to the system bus 21 is used to store a large amount of data, for example, a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14. The audio controller 31 is the hardware interface for external speakers 32 which may be used to produce to the synthesize speech. The audio controller 31 also is the hardware interface for a microphone 33 used to receive sample from the user. Lastly, also coupled to the system bus is digital signal processor 34 which is preferably in incorporated into the audio controller 31.

Figure 3:
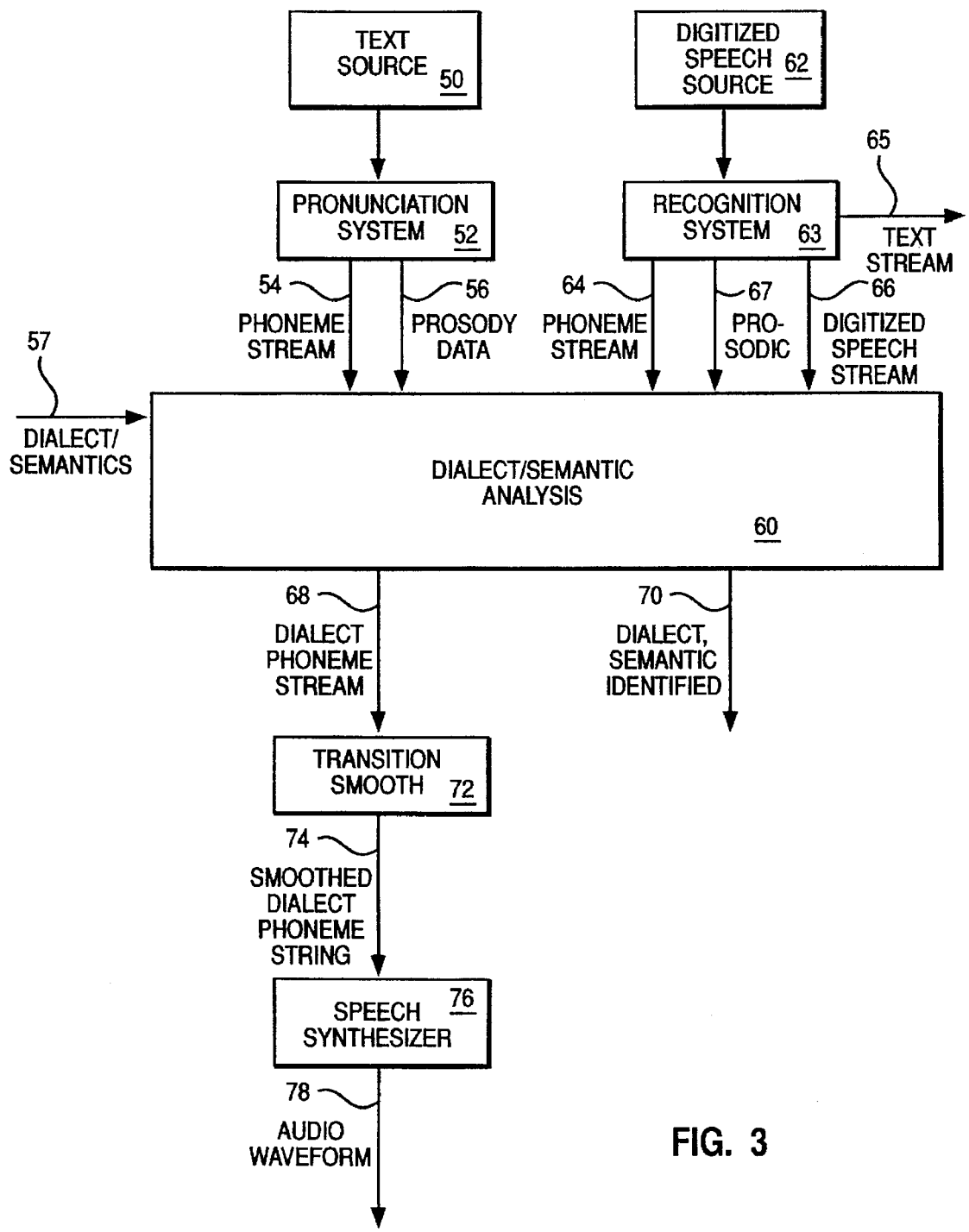
FIG. 3 is a block diagram of the speech analysis/synthesis system according to the present invention.

FIG. 3 is an architectural block diagram of the speech synthesis/analysis system of the present invention. The text source 50 may be from CD ROM storage or on magnetic disk storage or may be the result of the alphanumeric input from the keyboard of the computer. Alternatively, it may be from a set of data transmitted over a network to a local computer. For purposes of this invention, it does not matter greatly where the ascii or other character string originates.

A pronunciation system 52 may be architected according to any number of speech synthesis techniques, such as synthesis by rule or LPC conversion, what is important, however, is that pronunciation system 52 produces both the concatenated phoneme string 54 and prosody data 56 relating to the text string. For the purposes of this application, the term phoneme should be understood to be a general term for the linguistic unit used by the speech system. Allophones, diphones and triphones are all particular phoneme variants. One skilled in the art would recognize that the text string could be converted into a stream of allophones or diphones rather than phonemes and that the invention would work equally well. The phoneme string at 54 is not a concatenated series of phoneme codes, but rather the numerical data of the phonemes. Also, prosody data 56 may also include key word data such as pronouns, prepositions, articles and proper nouns, which may also be useful applying the intonational intervals to the phoneme string. In the case of speech synthesis, the system or user also chooses which dialect and semantic meaning to be applied to the phoneme string.

These inputs are made in data stream 57. The semantic information for speech synthesis would alternatively be included in the ascii text stream in terms of punctuation.

One pronunciation system which could be modified for the present invention is disclosed in U.S. Pat. No. 4,692,941 to Jacks et al, entitled, "Real Time Text to Speech Conversion System" which is hereby incorporated by reference. The system first analyzes the text with a sentence structure analyzer which detects the conjunctions, punctuation and key words. The sentence structure analyzer applies the system rules of prosody to each sentence within the text string and derives a set of prosody variables which constitute the prosody data 56. The system could be modified to provide a similar set of key word data. Next, the parser parses the text into words, numbers and punctuation and examines the word with an exception dictionary and a pronunciation rule interpreter. A concatenated phoneme sequence is developed by the system. The pronunciation system in the '941 patent would provide the phoneme and prosody data, but not the dialect data for the present invention.

The phoneme stream, prosody data and dialect data are used by the dialect/semantic analysis block 60 to produce an altered phoneme stream 67 according to the dialect chosen by the user or system. The process in the dialect/semantic analysis block 60 is outlined in greater detail below. A transition smoothing 72 is performed by interpolation or by a transition curve look-up. The smoothed dialect phoneme string results at 74 and is input to the speech synthesizer 76 to produce an audio waveform 78.

In speech analysis mode, the system can determine the dialect or language of a speaker from a stored or input audio speech sample. The digitized speech sample 62 could be from CD ROM or magnetic disk storage or could be from a realtime digitized audio signal from a microphone or telephone line coupled to the computer system. The audio waveform is segmented by the recognition system 63 where the phonemes or other linguistic units are identified. The recognition system 63 uses the identified phoneme codes for a table look-up of the stored intonation and formant values for those phoneme names and concatenates them into phoneme string 64.

The recognition system 63 passes, and the original digitized speech string 66 received from the speech source 62 and optionally the phoneme string derived from the stored values 64 to the dialect/semantic analysis block 60. One embodiment of the dialect recognition mode, is to select intervals of a certain threshold in the speech sample 66 and compare them to the interval and timing data for different dialects. Alternatively, a comparison is performed between the stored values 64 and the digitized speech values 66 to identify candidate intervals which may contain the dialect and semantic information of the speech sample. If the system is successful, the dialect and semantic information identified is output 70. As a refinement of the first method, the recognition system may analyze the digitized speech sample 62 for keyword or prosody data. The keyword and prosody data is inserted into the digital digitized speech sample 66 and sent to the dialect and semantic information analysis block 60. According to the dialect and semantic rules using the keyword and prosody indicia embedded in the string, a search is performed for candidate intervals which are then compared to the dialect and semantic interval values stored in the dialect and semantic tables.

Figure 4A:
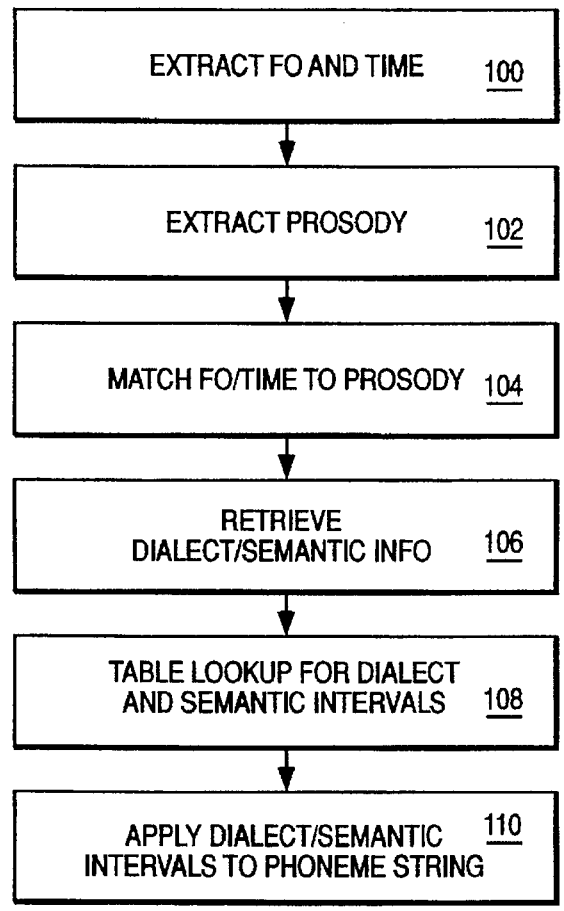
FIGS. 4A and 4B are flow diagrams of the table lookup process for the speech synthesis and analysis procedures respectively in the present invention.

FIG. 4A depicts the procedure in the dialect/semantic analysis block in speech synthesis mode. In step 100, the fundamental frequency and timing information is extracted from the phoneme stream. Next, in step 102, prosodic and keyword information is extracted. In step 104, the frequency and timing information is matched to the prosodic and keyword information. Step 104 is accomplished either by embedding prosodic information in the frequency and timing data stream or by constructing a third data string which matches specific frequency and timing information to the prosodic data. This third data stream may be constructed according to the dialect interval rules wherein phonemes which occur at a certain temporal relationship to prosodic or keyword events are candidates to apply the dialect and semantic information retrieved in a later table lookup.

Next, in step 106, the dialect and semantic information is retrieved. The dialect information is preferably from a user selection, e.g., the user types "British/English" at a command line in a user interface. The semantic information may also be input by the user, however, it can be extracted from the prosody data which in turn is derived from the punctuation in the original text source. In step 108, a table lookup is performed for the selected dialect and semantic context to retrieve the interval and timing information for this particular dialect and semantic context. For example, for British English an octave interval may be retrieved to be applied within two milliseconds (timing information) to the fundamental frequency. In step 110, the retrieved dialect and semantic intervals are applied to the phoneme string. The dialect and semantic intervals are preferably applied according to dialect and semantic rules. For example, when a prosodic event, such as a comma, period, question mark, etc., occurs in the text string, it is likely that a pitch variation in the synthesized speech waveform should occur in close proximity to this prosodic event. Therefore, a retrieved dialect interval may be applied to the fundamental frequency at some predetermined time prior or subsequent to such a prosodic event. Similarly, keywords may also coincide with a shift in the fundamental frequency in a particular dialect. The dialect interval rules may differ from one selected dialect to the next, having different predetermined time intervals from prosodic events different keywords and so forth. Finally, the dialect intervals may be applied randomly to the fundamental frequency parameter of the concatenated phoneme string derived from the stored parameters. While this method is less preferred, as a human listener will identify the specific set musical relationships with a specific dialect, a recognizable approximation of the dialect in a synthesized speech can be obtained.

Figure 4B:
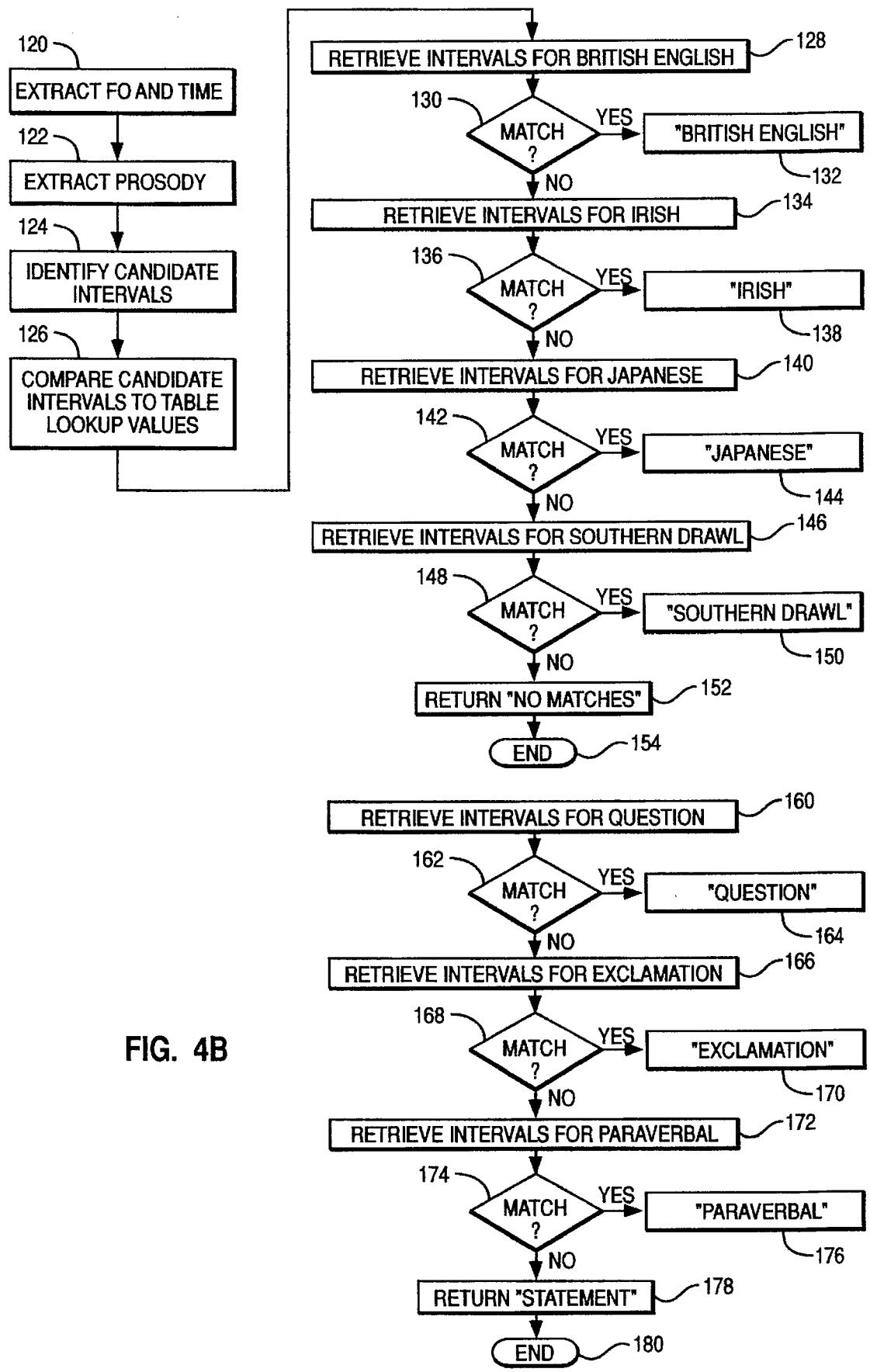

A process flow depicted in FIG. 4B is for speech analysis using the dialect and semantic interval tables. It is somewhat more complicated than FIG. 4A as a series of tests for dialect and semantic context may be required. The process begins in step 120, where the phoneme frequency and timing information are extracted from the digitized speech stream. Next, the prosodic information corresponding to the speech string is extracted, if not already provided by the recognition system, step 122. Next, in step 124, the frequency and timing information is examined for candidate intervals. This may be performed in several ways. First, a comparison of the digitized speech string with a concatenated phoneme string will yield a series of intervals in the digitized speech string which differ from the canned phoneme values. These differences are then the candidate intervals which will be examined at later steps of the process. Second, the digitized speech string may be compared to prosodic or keyword information to identify phoneme frequency intervals which occur at a certain temporal relationship to the prosodic or keyword data according to dialect or semantic rules of the speech system. The fundamental frequency intervals at these times are then the candidate intervals. Third, a search may be performed for any interval which is greater than a particular threshold. This method is advantageous in that it requires less processing. As intervals must be of a certain magnitude to be easily perceptible by human listener, it is likely that the intervals of higher magnitude are those which the listener will normally associate with a given dialect or language.

Next, in steps 126 through 180, the candidate intervals are compared to the table lookup values. In steps 128 through 154, comparisons are made to the dialect table. In steps 160 through 180, comparisons are made to the semantic context table. While the tests in the flow diagram are representative of those which may be performed, they are not exhaustive and a great many more comparison tests could be performed. In step 128, the interval values in the lookup table for British English are retrieved. In step 130, these are compared to the candidate intervals to determine whether or not there is a match. If so, in step 132, British English is returned to the user interface of the system for the user's information. In step 134, the interval values for an Irish accent are retrieved from the lookup table. The Irish interval values are matched with candidate intervals in step 136. If there is a match, "Irish" is returned to the user interface in step 138. If there is no match, the process proceeds by retrieving the intervals values for Japanese in step 140. Step 140 was included to illustrate that the method of the present invention may be used to identify languages as well as dialects of a particular language. Next, in step 142, the lookup values for Japanese are compared with the candidate intervals. If there is a match, in step 144, "japanese" is returned to the user interface of the system. If there is no match, in step 146, the interval values for southern drawl are retrieved. In step 148, a test is performed whether there is a match with the candidate intervals. If so, southern drawl is returned to the interface of the system. At this point, more tests could be performed, however, in FIG. 4B, only four tests are performed for dialect or language so the system will return "no matches" to the user interface of the system in step 152. Alternatively, the system may conclude that the dialect is a default dialect, such as Mid-Western American English. The process ends in 154.

Next, if a semantic context test is indicated in step 160, the interval values for a question are retrieved by table lookup. Next, step 162, a test is performed to determine whether the candidate intervals match the question intervals. If so, "question" is returned to the user interface of the system in step 164. If there is no match, the system will retrieve the lookup values for an exclamation, step 166, test to determine whether there is a match, step 168, and return "exclamation" in step 170 if there is a successful match. If there is no match, the process will continue to step 172 to retrieve the lookup values for a paraverbal vocalization, the system will test for a match in step 174. If there is a successful match, in step 176, "paraverbal" is returned to the user interface. Further, tests could be performed, however, in FIG. 4B, the system will return statement to the user interface concluding that the digitized speech sample was a statement. The process ends in step 180.

Alternatively, rather than exiting after a successful match for a given dialect or semantic context, the system may perform a comparison for all dialects or all semantic contexts. The degree to which the digitized speech sample matches the various dialects may be calculated in terms of probability and a table of the most likely dialect and semantic context may be presented to the user together with the calculated probability of each.

FIG. 5A is a table of frequencies for the diatonic scale for three octaves. Each note has a frequency (Hz) for each of the Octaves associated with the note. Each Octave is associated with a particular range of frequencies and within a range of frequencies each note is allocated to a particular frequency. For example, in an "A" is associated with 110 hertz in the first octave, 220 hertz in a second octave and 440 hertz in third octave. The values given in the table are approximate and not absolute.

The relationship between intervals such as a major and minor second and third, perfect fourth and fifth octave are compared to a frequency ratio in FIG. 5B for the key of C. Thus, a major third, for example, C to E has an approximate frequency ratio of 1.26. For an octave, e.g., C to C, the frequency ratio is 1:2. The invention is based on the premise that musical intervals in the fundamental frequency in speech provide an important auditory cue for a human listener to determine the dialect or language of a particular speaker. The diatonic scale in FIGS. 5A and 5B are well known to most Western cultures. However, Eastern languages such as Chinese and Japanese are based on different scales such as the In or Yo scales and could be used to set the dialect intervals relationships. Further, there are other Western musical scales such as the whole-tone scale which can be used according of the principles of the present invention.

FIG. 6 depicts a dialect and semantic table which can be used in the synthesis or analysis process. Each dialect for example, British English, has a set of associated intervals which will occur within a certain limited time period and will either be rising or descending. For example, "BI," represents a first British English interval, e.g., an octave; T1 represents a time interval or period within which the interval is to be applied, e.g., two milliseconds. "R" or a "D" represents a rising or descending interval respectively. In the table, only three intervals are listed for each dialect, however, the table could be expanded as appropriate for each dialect or language. It is not necessary that each dialect have an identical number of characteristic intervals.

It is desirable to add dialect interval rules which would prevent the same interval from being applied monotonously. Also threshold values should be applied so that a synthesized speech sample is not repeatedly raised or lowered to sound ridiculously high or low. While the timing information in FIG. 6 is associated with each intonational interval, it would be possible to have a default value, e.g., 2 milliseconds for all dialects or a default value for each particular dialect. It has been the experience of the Applicant that the time interval during which the intonational interval is applied is longer for a semantic context, e.g., 5 milliseconds or greater, than for a dialect, e.g., 2 milliseconds or smaller.

The interval relationships in the table can be expressed in a number of different formats. A given interval can be expressed as two successive absolute frequencies $X_1$, $X_2$. Absolute frequencies could be adequate for speech synthesis with a known set of intonational values for the stored phonemes. However, analyzing a speech sample could be difficult as the frequencies in the sample may never match the absolute frequencies given in the table. The speech sample could possibly be normalized so that the overall pitch could correspond to that of the concatenated waveform derived from the stored phonemes. A given interval could also be expressed in terms of a delta in frequency, $\Delta X$. A delta in frequency would work with a known set of phonemes for speech synthesis and would not require a normalization process for analyzing a speech sample. However, it does not reflect the musical principles on which the present invention is based. It is the relationship of the frequencies between two pitches which is most meaningful to the human ear. If a fixed change in frequency is applied to two pitches an octave apart, the change in musical relationship will be smaller for the higher pitch. It is preferred to express the intervals in terms of their musical relationships, e.g., octave (8Va), major third (M3), perfect fifth (P5), etc. or the ratio of their frequencies, e.g., 1:2. The ratio of the frequencies of two pitches an octave apart is 1:2, the pitch. It is preferred to express the intervals in terms of their musical relationships, e.g., octave (8Va), major third (M3), perfect fifth (P5), etc. or the ratio of their frequencies, e.g., 1:2. The ratio of the frequencies of two pitches an octave apart is 1:2, the ratio of the frequencies of the pitches in a major triad is 4:5:6.

The process for the selecting the intervals for a given dialect is highly empirical, requiring repeated pitch segmentation of audio samples, a trained ear and a certain degree of subjective judgement. Certain languages such as Oriental languages can be more difficult for a Western listener to determine as they depend on different musical relationships than those to which he is accustomed. Certain Japanese and Chinese scales are related. There are 4–5 important pitches in Chinese; Japanese use 4 tones although 2 are primary and 2 are secondary. Further, these languages also depend on formal or informal tenses as well (e.g., In scale vs. Yo scales). For British English, sequences of 8va, M7 and m7 are to be applied within a time slice 2 milliseconds or less. For Japanese, sequences of PS, P4, M2 and m2 are important, also to be applied within 2 milliseconds or less. For Irish, sequences of M6, m6 and M3 are important with a time interval of 2 milliseconds. Generally, spoken Irish has inverted contours from English, e.g., a m3 vs M6 relationship. US English in a Mid-Western dialect uses sequences of P5, M3, P4, 8va and m3 in a time slice of 2 milliseconds or less.

As an example of how intonation intervals might be applied to a text string according to prosodic or keyword information consider the following text illustrated in FIG. 6A: The text is parsed into its constituent phonemes, transitions between phonemes, silence between words and prosodic events. In the figure, the phoneme for the consonant "S" is represented as "Ps", the transition between the phonemes "S" and "0" is represented as "Tso" and so forth. A period of silence is represented as "S" and prosodic event for a period is shown as "PEperiod".

Presuming that the user has chosen US English, Midwestern dialect and the interval rule for the Midwestern dialect is that an interval is applied to the first vowel phoneme after a prosodic event, the speech system will apply the intervals retrieved from the table to the phoneme "E" in "Seven" and the phoneme "U" in "whose". The interval applied to the phoneme "E" might be an ascending perfect fourth and the interval applied to the phoneme "U" might be a descending perfect fifth. The figure also shows that "whose" is a possible key word. The interval rules for a key word might override those for the prosodic event. For instance, the rule might be that the interval applied to the key word had to be ascending. So the descending perfect fifth retrieved from the table for the prosodic event would be discarded and a table lookup would be performed until an ascending interval was found.

Two examples following the tables below illustrate the application of interval values to a concatenated phoneme string according to the present invention. The fundamental frequency $f_0$ and the formant values $f_1$, $f_2$, $f_3$, $f_4$, $f_5$, $f_H$, are given in stored Hz values. AO is the overall amplitude of the sample and AN is the nasal amplitude of the sample. Other parameter values can be used to describe a phoneme for a speech synthesizer but are not included as they do not directly apply to the present invention. Notice also that the formant values were kept static as a primary concern was the intonational contour form by the fundamental frequency, $f_0$. In many speech synthesizers, the formant values will vary across the phoneme. Also, because the text fragment is relatively small the interval information is applied randomly, rather than according to prosodic events or keywords to illustrate several more intervals than there might normally occur within a single word.

The column labelled "Before" represents the concatenated phonemes string before interval values from the dialect or semantic tables of the present invention are applied. Thus, they represent a preexisting intonational contour. The second column is labelled "British English" and represents the case where the intervals from the British English dialect table are applied to the phoneme string. As the intervals are applied randomly, occasionally the intervals will be applied to an unvoiced phoneme where the interval is not effective. For example, the phoneme "S" in this example. The fundamental frequency for the first voiced vowel "e" has been changed to 261Hz, which is middle "C" The second voiced vowel, also a phoneme "e" has been changed to 196 Hz or G. The final phoneme "n" which is a voiced consonant, has been changed to 127HZ, approximately "C" below middle "C". Also, in the example, the intonational contours between these key frequencies is smoothed to make the transitions sound more natural.

In the second case, illustrated by the "BEFORE" "QUESTION" columns, the fundamental frequency rises from 138 Hz, approximately C sharp, to 185 Hz, approximately F sharp, a perfect 4th. In this case, the rising intonational contour for semantic content requires more time than the intonational changes due to dialect.

```
****************************************    ****************************************
BEFORE                                       BRITISH ENGLISH
****************************************    ****************************************
F0  F1  F2  F3  F4  F5  FH  A0  AN           F0  F1  F2  F3  F4  F5  FH  A0  AN
****************************************    ****************************************
start of phoneme - S -                       start of phoneme - S -
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       216,210,1500,2500,3000,4500,5000,10  0
148,210,1500,2500,3000,4500,5000,10  0       216,210,1500,2500,3000,4500,5000,10  0
148,210,1500,2500,3000,4500,5000,10  0       216,210,1500,2500,3000,4500,5000,10  0
148,210,1500,2500,3000,4500,5000,10  0       216,210,1500,2500,3000,4500,5000,10  0
148,210,1500,2500,3000,4500,5000,10  0       216,210,1500,2500,3000,4500,5000,10  0
148,210,1500,2500,3000,4500,5000,10  0       216,210,1500,2500,3000,4500,5000,10  0
148,210,1500,2500,3000,4500,5000,10  0       216,210,1500,2500,3000,4500,5000,10  0
148,210,1500,2500,3000,4500,5000, 0  9       216,210,1500,2500,3000,4500,5000, 0  9
148,210,1500,2500,3000,4500,5000, 0  9       216,210,1500,2500,3000,4500,5000, 0  9
148,210,1500,2500,3000,4500,5000, 0  9       148,210,1500,2500,3000,4500,5000, 0  9
148,210,1500,2500,3000,4500,5000, 0  9       148,210,1500,2500,3000,4500,5000, 0  9
148,210,1500,2500,3000,4500,5000, 0  9       148,210,1500,2500,3000,4500,5000, 0  9
****************************************    ****************************************
Start of phoneme - E-                        Start of phoneme - E-
148,210,1500,2500,3000,4500,5000, 9  0       261,240,1200,2300,3000,4600,5000, 9  0
148,210,1500,2500,3000,4500,5000, 9  0       261,240,1200,2300,3000,4600,5000, 9  0
150,240,1200,2300,3000,4600,5000, 9  0       261,240,1200,2300,3000,4600,5000, 9  0
150,240,1200,2300,3000,4600,5000, 9  0       261,240,1200,2300,3000,4600,5000, 9  0
151,240,1200,2300,3000,4600,5000, 9  0       261,240,1200,2300,3000,4600,5000, 9  0
151,240,1200,2300,3000,4600,5000, 9  0       261,240,1200,2300,3000,4600,5000, 9  0
151,240,1200,2300,3000,4600,5000, 9  0       261,240,1200,2300,3000,4600,5000, 9  0
144,240,1200,2300,3000,4600,5000, 9  0       261,240,1200,2300,3000,4600,5000, 9  0
144,240,1200,2300,3000,4600,5000, 9  0       261,240,1200,2300,3000,4600,5000, 9  0
144,240,1200,2300,3000,4600,5000, 9  0       255,240,1200,2300,3000 4600,5000, 9  0
135,240,1200,2300,3000,4600,5000, 9  0       255,240,1200,2300,3000 4600,5000, 9  0
135,240,1200,2300,3000,4600,5000, 9  0       246,240,1200,2300,3000 4600,5000, 9  0
135,240,1200,2300,3000,4600,5000, 9  0       246,240,1200,2300,3000 4600,5000, 9  0
135,240,1200,2300,3000,4600,5000, 9  0       246,240,1200,2300,3000 4600,5000, 9  0
****************************************    261 HZ = important interval
                                             ****************************************
start of phoneme -V-                         start of phoneme -V-
131,230,1400,2500,3000,4600,5000, 7, 0       240,230,1400,2500,3000,4600,5000, 7, 0
131,230,1400,2500,3000,4600,5000, 7, 0       240,230,1400,2500,3000,4600,5000, 7, 0
137,230,1400,2500,3000,4600,5000, 7, 0       232,230,1400,2500,3000,4600,5000, 7, 0
137,230,1400,2500,3000,4600,5000, 7, 0       200,230,1400,2500,3000,4600,5000, 7, 0
137,230,1400,2500,3000,4600,5000, 7, 0       198,230,1400,2500,3000,4600,5000, 7, 0
****************************************    ****************************************
```

-continued

```
start of phoneme -E-                         start of phoneme -E-
140,250,1500,2600,3000,4500,5000,10, 0       196,250,1500,2600,3000,4500,5000,10, 0
140,250,1500,2600,3000,4500,5000,10, 0       196,250,1500,2600,3000,4500,5000,10, 0
140,250,1500,2600,3000,4500,5000,10, 0       196,250,1500,2600,3000,4500,5000,10, 0
140,250,1500,2600,3000,4500,5000,10, 0       196,250,1500,2600,3000,4500,5000,10, 0
140,250,1500,2600,3000,4500,5000,10, 0       172,250,1500,2600,3000,4500,5000,10, 0
*****************************************   *****************************************
* start of phoneme -N-                       start of phoneme -N-
138,240,1400,2500.3000,4500,5000, 8, 0       160,240,1400,2500,3000,4500,5000, 8, 0
138,240,1400,2500.3000,4500,5000, 7, 0       152,240,1400,2500,3000,4500,5000, 7, 0
138,240,1400,2500.3000,4500,5000, 6, 0       147,240,1400,2500,3000,4500,5000, 6, 0
135,240,1400,2500,3000,4500,5000, 0, 8       138,240,1400,2500,3000,4500,5000, 0, 8
135,240,1400,2500,3000,4500,5000, 0, 8       130,240,1400,2500,3000,4500,5000, 0, 8
135,240,1400,2500,3000,4500,5000, 0, 8       130,240,1400,2500,3000,4500,5000, 0, 8
127,240,1400,2500,3000,4500,5000, 0, 8       130,240,1400,2500,3000,4500,5000, 0, 8
127,240,1400,2500,3000,4500,5000, 0, 8       130,240,1400,2500,3000,4500,5000, 0, 8
127,240,1400,2500,3000,4500,5000, 0, 8       130,240,1400,2500,3000,4500,5000, 0, 8
                                             130 Hz - imeportant inverval
*****************************************************************************
*****************************************   *****************************************
BEFORE                                       QUESTIONS
*****************************************   *****************************************
F0  F1   F2   F3   F4   F5   FH  A0 AN       F0  F1   F2   F3   F4   F5   FH  A0 AN
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
216,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,240,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000,10  0       148,210,1500,2500,3000,4500,5000,10  0
148,210,1500,2500,3000,4500,5000, 0  9       148,210,1500,2500,3000,4500,5000, 0  9
148,210,1500,2500,3000,4500,5000, 0  9       148,210,1500,2500,3000,4500,5000, 0  9
148,210,1500,2500,3000,4500,5000, 0  9       148,210,1500,2500,3000,4500,5000, 0  9
148,210,1500,2500,3000,4500,5000, 0  9       148,210,1500,2500,3000,4500,5000, 0  9
148,210,1500,2500,3000,4500,5000, 0  9       148,210,1500,2500,3000,4500,5000, 0  9
*****************************************   *****************************************
Start of phoneme - E-                        Start of phoneme - E-
148,210,1500,2500,3000,4500,5000, 9  0       138,240,1200,2300,3000,4600,5000, 9  0
148,210,1500,2500,3000,4500,5000, 9  0       138 Hz - important
150,210,1500,2500,3000,4500,5000, 9  0       138,240,1200,2300,3000,4600,5000, 9  0
150,210,1500,2500,3000,4500,5000, 9  0       interval
151,210,1500,2500,3000,4500,5000, 9  0       138,240,1200,2300,3000,4600,5000, 9  0
151,210,1500,2500,3000,4500,5000, 9  0       138,240,1200,2300,3000,4600,5000, 9  0
151,210,1500,2500,3000,4500,5000, 9  0       138,240,1200,2300,3000,4600,5000, 9  0
144,210,1500,2500,3000,4500,5000, 9  0       138,240,1200,2300,3000,4600,5000, 9  0
144,210,1500,2500,3000,4500,5000, 9  0       138,240,1200,2300,3000,4600,5000, 9  0
144,210,1500,2500,3000,4500,5000, 9  0       138,240,1200,2300,3000,4600,5000, 9  0
135,210,1500,2500,3000,4500,5000, 9  0       138,240,1200,2300,3000,4600,5000, 9  0
135,210,1500,2500,3000,4500,5000, 9  0       138,240,1200,2300,3000,4600,5000, 9  0
135,210,1500,2500,3000,4500,5000, 9  0       135,240,1200,2300,3000,4600,5000, 9  0
135,210,1500,2500,3000,4500,5000, 9  0       135,240,1200,2300,3000,4600,5000, 9  0
*****************************************   135,240,1200,2300,3000,4600,5000, 9  0
                                             135,240,1200,2300,3000,4600,5000, 9  0
                                             *****************************************
start of phoneme -V-                         start of phoneme -V-
134,230,1400,2500,3000,4600,5000, 7, 0       137,230,1400,2500,3000,4600,5000, 7, 0
134,230,1400,2500,3000,4600,5000, 7, 0       138,230,1400,2500,3000,4600,5000, 7, 0
134,230,1400,2500,3000,4600,5000, 7, 0       140,230,1400,2500,3000,4600,5000, 7, 0
134,230,1400,2500,3000,4600,5000, 7, 0       147,230,1400,2500,3000,4600,5000, 7, 0
134,230,1400,2500,3000,4600,5000, 7, 0       149,230,1400,2500,3000,4600,5000, 7, 0
*****************************************   *****************************************
start of phoneme -E-                         start of phoneme -E-
140,250,1500,2600,3000,4500,5000,10, 0       150,250,1500,2600,3000,4500,5000,10, 0
140,250,1500,2600,3000,4500,5000,10, 0       157,250,1500,2600,3000,4500,5000,10, 0
140,250,1500,2600,3000,4500,5000,10, 0       163,250,1500,2600,3000,4500,5000,10, 0
140,250,1500,2600,3000,4500,5000,10, 0       182,250,1500,2600,3000,4500,5000,10, 0
140,250,1500,2600,3000,4500,5000,10, 0       183,250,1500,2600,3000,4500,5000,10, 0
*****************************************   *****************************************
* start of phoneme -N-                       start of phoneme -N-
138,240,1400,2500,3000,4500,5000, 8, 0       185,240,1400,2500,3000,4500,5000, 8, 0
138,240,1400,2500,3000,4500,5000, 7, 0       185 Hz - important interval
138,240,1400,2500,3000,4500,5000, 6, 0       185,240,1400,2500,3000,4500,5000, 7, 0
135,240,1400,2500,3000,4500,5000, 0, 0       185,240,1400,2500,3000,4500,5000, 6, 0
135,240,1400,2500,3000,4500,5000, 0, 0       185,240,1400,2500,3000,4500,5000, 0, 0
135,240,1400,2500,3000,4500,5000, 0, 0       185,240,1400,2500,3000,4500,5000, 0, 0
127,240,1400,2500,3000,4500,5000, 0, 0       185,240,1400,2500,3000,4500,5000, 0, 0
```

```
127,240,1400,2500,3000,4500,5000, 0, 0          185,240,1400,2500,3000,4500,5000, 0, 0
127,240,1400,2500,3000,4500,5000, 0, 0          185,240,1400,2500,3000,4500,5000, 0, 0
                                                185,240,1400,2500,3000,4500,5000, 0, 0
****************************************************************************************
```

A series of pseudo code segments are presented which represent code modules present in the dialect semantic analysis block.

```
If Speech Buffer is not empty and phonemic
representation is passed as input then
    Call Segment_PitchSpec
        Select Phoneme
        Select Rhythm
        Select Intonation
            Call Analyze_Scales
                Select Pitch_Scale_Matrix
                Select Rhythm
                Select Phoneme From Intonation
                    Call Determine_dialect
                        Select Pitch_Scale_Matrix
                        Select Intervalic_Relationship
                    Call Determine_Semantic
                        Select Pitch_Scale_Matrix
                        Select Intervalic_Relationship
                    END If
Speech Output
If Speech Buffer is not empty then
    Send Semantic_Phonemes/Dialect_Phonemes to next
(input) module/function
    Send to (output) audio port on Speech Synthesizer
    END If
```

The following pseudo code illustrates a portion of the algorithmic technique for the intonational module.

```
Main ()
initialize speech_parameters();
if (new_phoneme_pitch == f0 || old_phoneme_pitch ==f0
    /* call segment pitch spectrum */
    Segment_pitch(new_phenome_pitch);
    } /* end of main */
```

This procedure segments the pitch spectrum

```
Procedure Segment_pitchspec(new_phoneme_pitch);
    array f0{}:= {30 Hz, 31 Hz, ... 200 Hz};
    array signal_fluctuations{} := {enerqy_spectrum};
    array decomposed_signal_boundary{} := {{segments}, {spikes},
                {amplitudes},hesitation_pauses}};
    if ((new_phoneme_pitch == f0)&&(f0 ==
                decomposed_signal_boundary))
        for (n=0;n<upper_bound;n++) {
            phoneme_frequency{n} := decomposed_signal_boundry{n};
    signal_fluctuations{n} := decomposed_signal_boundary{n};
/* call analyze scales for intonation and music content */
Analyze_scales(phoneme_frequency{n},signal_fluctuations{n});
    }
    else
    null;
    } /* end of Segment_pitchspec */
```

This procedure performs an analysis of the phoneme and signal data and calls lower level routines to determine dialect and semantic information.

```
Analyze_scales(phoneme_frequency{n},
signal_fluctuations{n});
    array musical_durations{} := {tick_beats};
    array musical_intervals{} := {P5,P4,M3, ... };
    for (n=0;n<upper_bound;n++) {
        freq_info{n} := extract(phoneme_frequency{n});
        pause_info{n} := extract(signal_fluctuations{n});
        if ((freq_info{n} == musical_intervals{n}) &&
            pause_info{n} == musical_durations{n}))
        /* call dialects */
Determine_dialect(freq_info{n},pause_info{n},
dialect_phonemes{n});
            output(dialect_phonemes{n});
        else
        if ((freq_info{n} == musical_intervals{n}) &&
            pause_info{n} == musical_durations{n}))
        /* call semantics */
            Determine_semantic(freq_info{n},pause_info{n},
                    semantic_phonemes{n});
            output(semantic_phonemes{n});
        else
        null;
    }
} /* end of Analyze_scales */
```

This procedure determines dialect by interval classification and timing information. If there is a match, then a dialect assignment is given.

```
Procedure Determine_dialect(freq_info{n},pause_info{n},
              dialect_phonemes{n});
  array interval_classification{} := {frequency_intervals};
  array musical_intervals{} := {P5,P4,M3,...};
    /* determine dialect and assign values */
    for (n=0;n<upper bound;n++) {
      if ((freq_info{n} && pause_info{n}) ==
          (interval_classification{n} >= Hz_value))
        British_English := musical_intervals{n};
      else
      if ((freq_info{n} && pause_info{n}) ==
          (interval_classification{n} >= Hz_value))
        Irish := musical_intervals{n};
      else
      if ((freq_info{n} && pause_info{n}) ==
          (interval_classification{n} >= Hz_value))
        Japanese := musical_intervals{n};
      else
      if ((freq_info{n} && pause_info{n}) ==
          (interval_classification{n} >= Hz_value))
        Southern_Drawl := musical_intervals{n};
      else
      ...
      /* similar logic, but with remaining dialects
      and values */
    }
    for (n=0;n<upper_bound;n++) {
      /* assign dialect_phoneme values for output */
      if ((British_English == musical_intervals{n}) ||
          (British_English == pause_info{n}))
        dialect_phonemes{n} := specific
          (musical_intervals{n},
                      pause_info{n});
      else
      ...
      /* similar logic, but with remaining dialects and
      values */
    }
  } /* end of Determine_dialect */
```

This procedure determines semantic information by different material classification and timing information. If it detects a match, then a semantic assignment is given.

```
Procedure Determine_semantic(freq_info{n},pause_info{n},
              semantic_phonemes{n});    {
  array interval_classification{} := {frequency_intervals};
  array musical_intervals{} := {P5,P4,M3, ...};
    /* determine semantic meaning */
    for (n=0;n<upper bound;n++) {
      if ((freq_info{n} && pause_info{n}) ==
          (interval_classification{n} == P5))
        Question1 := musical_intervals{n};
      else
      if ((freq_info{n} && pause_info{n}) ==
          (interval_classification{n} >= P4))
        Question2 := musical_interval{n};
      else
      ...
      /* similar logic for remaining semantic values */
    }
    for (n=0;n<upper_bound;n++) {
      /* assign semantic values for output */
      if ((Question1 == musical_intervals{n}) ||
          (Question1 == pause_info{n}))
        semantic_phonemes{n} := specific
          (musical_intervals{n},
                      pause_info{n});
      else
      ...
      /* similar logic for remaining semantic meaning */
      /* frequency contours for output */
    }
                          { /* end of
Determine_semantic */
```

Figure 7:
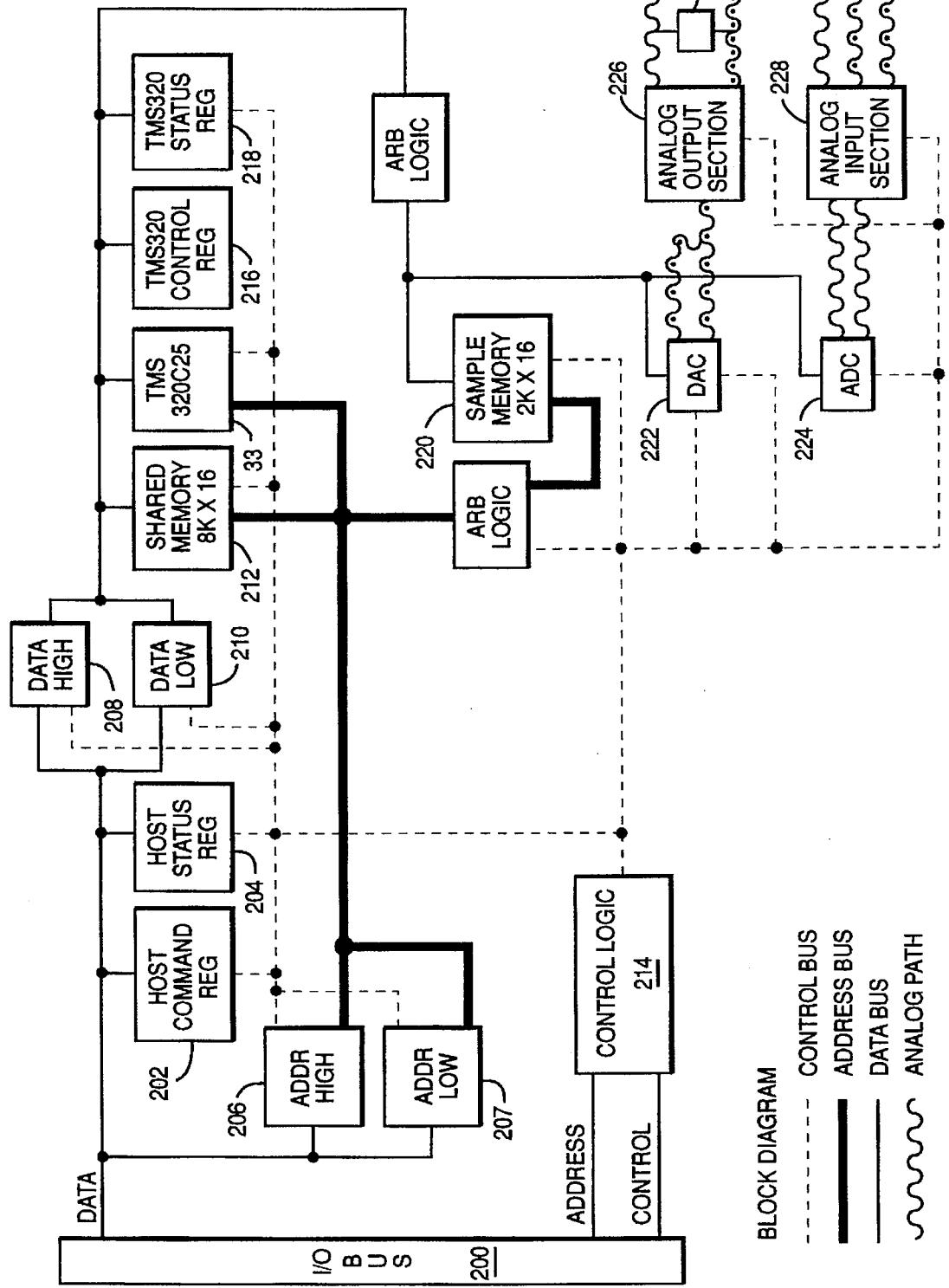
FIG. 7 depicts an audio controller card which can be used to control the speaker or microphone used in the present invention.

FIG. 7 depicts the audio controller card which includes a digital signal processor (DSP) for the correction of the speaker response. The audio card is used for the conversion from digital representation of audio to the analog wave form and vice versa, the host computer performs all other operations.

One possible audio controller is the M-Audio capture and playback adapter announced and shipped on Sep. 18, 1990 by the IBM Corporation. Referring to FIG. 7, the I/O bus is a microchannel for PC I/O bus 200 which allows the audio controller. The computer passes information via the I/O bus 200 to the audio controller employing a command register 202, a status register 204 and address high byte counter 206 and address low byte counter 207, a high data high byte bidirectional latch 208, and a data low bidirectional latch 210. These registers are used by the computer to issue commands and monitor the status of the audio controller card. The address and data latches are used by the personal computer to access the shared memory 212, which is an 8 K by 16 bit static RAM on the audio controller card. The shared memory 212 also provides a mean of communication between the personal computer and the digital signal processor 33.

A memory arbiter, part of the control logic 214, prevents the personal computer and the DSP 33 from accessing the shared memory 212 at the same time. A shared memory 212 can be divided so that part of the information is logic used to control the digital signal processor 33, the digital signal processor has its on control registers 216 and status registers 218 for issuing commands and monitoring the status of other parts of the audio controller card. The audio controller card contains another block of RAM called the Sample Memory 220. The sample memory 220 is a 2K by 16 bit static RAM which the DSP 33 uses for outgoing audio signals to be played on these speakers systems or incoming signals of digitized audio, for example the sonic mouse for transfer to the personal computer for storage. The digital analog converter (DAC) 222 and the analog digital converter (ADC) 224, convert the audio signal between the digital environment of the computer and the analog sound produced by the speakers. The DAC 222 receives digital samples from the sample memory 220 converts the samples to analog signals and send these signals to the analog output section 226. The analog output section 226 conditions and sends the signals to the output connectors for transmission via the speaker system.

The ADC 224 is the counterpart of the DAC 222. The ADC 224 receives analog signals from the analog input section 228 which receive the signals from the speaker system acting as a microphone or other audio input device such as a tape player. The ADC 224 converts the analog signals to digital samples and stores them in the sample memory 220. The control object 214 issues interrupts to the personal computer after the DSP 33 has issued an interrupt request.

Recording and the analysis of a continuous (or discrete) speech signal works in the following manner. After the computer has performed necessary calculations and analyses via I/O bus 200, the computer instructs the DSP 33 to enters a wait-state. If a playback task is required, the host (computer), while controlling the DSP 3 and accessing audio speech samples from memory or disk, transfers them to shared memory 212 where the DSP 33 in turn converts these numeric representations (of audio information), and deposits them into sample memory 220. The DSP 33 then requests the DAC 222 to digitize sample into an analog sound at the analog output section.

The parsing of a text-string file works in a similar manner. However, the parsing of the string-file, which is accomplished on the host computer, is a separate specialized function, and does not require host command or status operations. However, the playback task as described above is similar concerning synthesis.

A second aspect of the invention is to contour the transitions between phonemes after the intonational intervals have been applied. As the intervals in the dialect tables are relatively large, smoothing of the intonational contours is necessary to provide a natural sound.

Figure 8:
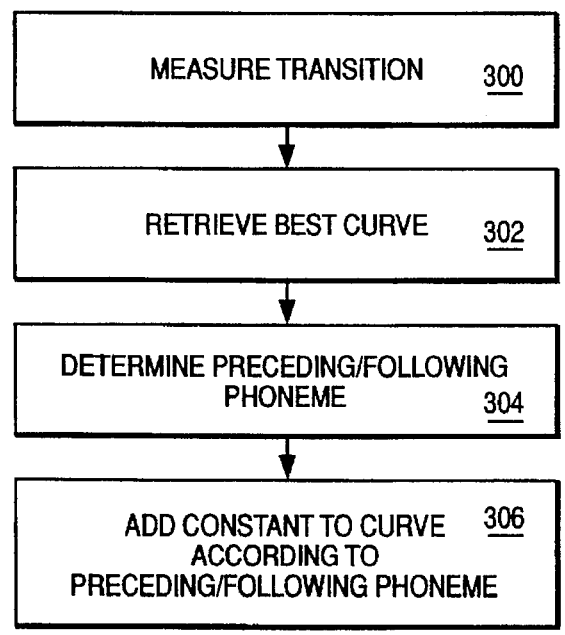
FIG. 8 is a flow diagram of the transition smoothing process in the present invention.

FIG. 8 illustrates a simplified contouring procedure which can be applied to the synthesis or analysis system of the present invention. In step 300, the transition between adjacent phonemes after the dialect or semantic intervals have been applied as measured. Based on the difference between the fundamental frequencies of the two phonemes, the best transition curve is retrieved from a table lookup. Typically, there are ten or so transition curves stored in such a table. Next, in step 304, the preceding and following phonemes are identified. In step 306, a constant is added to the transition curve according to either the preceding or following phoneme or both. One rule which has been found to be particularly successful is that the constant is added according to the consonant phoneme of the transition. That is, in a transition in the word "seven", there is a first transition between the "s" and "e" phonemes, a second transition between the "e" and "v" phonemes, a third transition between the "v" and the "e" phonemes and a fourth transition between the "e" and the "n" phoneme. The first transition would have the constant chosen according to the preceding "s" phoneme; the second transition would have its constant chosen according to the following "v" consonant phoneme; the third transition would also have its constant chosen according to the "v" phoneme but it would be preceding and the fourth transition would have its constant chosen according to the following "n" consonant phoneme.

There are four rules which may also be applied to the transition contouring process. The first rule is that if harmonic frequencies occur between one phoneme and another, these phonemes should be bridged by modulating the fundamental frequency as it makes the transition. A second rule is to gradually raise or lower the fundamental frequency outside the transition region where necessary. For example, where the interval between phonemes was especially large. A third rule is to vary the vowels occur near voiced consonants higher than the frequency at which the vowel originally began. A fourth rule is not to overemphasize the main interval. While the interval is important so that a listener perceives a given dialect, if it is applied too mechanically, it can create a sing-song effect.

The following tables show the BEFORE and AFTER cases of transition contouring.

```
****************************************        ****************************************
BEFORE bumping                                   AFTER bumping
****************************************        ****************************************
F0  F1   F2   F3   F4   F5   FH   A0  AN         F0  F1   F2   F3   F4   F5   FH   A0  AN
****************************************        ****************************************
start of phoneme -S-                             start of phoneme - S-
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000,10  0           148,210,1500,2500,3000,4500,5000,10  0
148,210,1500,2500,3000,4500,5000, 0  9           148,210,1500,2500,3000,4500,5000,10  0
148,210,1500,2500,3000,4500,5000, 0  9           148,210,1500,2500,3000,4500,5000,10  0
148,210,1500,2500,3000,4500,5000, 0  9           148,210,1500,2500,3000,4500,5000,10  0
148,210,1500,2500,3000,4500,5000, 0  9           148,210,1500,2500,3000,4500,5000,10  0
148,210,1500,2500,3000,4500,5000, 0  9           148,210,1500,2500,3000,4500,5000,10  0
****************************************        ****************************************
Start of phoneme - E-                            Start of phoneme - E-
148,240,1200,2300,3000,4600,5000, 9  0           155,240,1200,2300,3000,4600,5000, 9  0
148,240,1200,2300,3000,4600,5000, 9  0           ***First 2 records
150,240,1200,2300,3000,4600,5000, 9  0           155,240,1200,2300,3000,4600,5000, 9  0
150,240,1200,2300,3000,4600,5000, 9  0           ***increased to +7Hz.
151,240,1200,2300,3000,4600,5000, 9  0           150,240,1200,2300,3000,4600,5000, 9  0
151,240,1200,2300,3000,4600,5000, 9  0           150,240,1200,2300,3000,4600,5000, 9  0
151,240,1200,2300,3000,4600,5000, 9  0           151,240,1200,2300,3000,4600,5000, 9  0
144,240,1200,2300,3000,4600,5000, 9  0           150,240,1200,2300,3000,4600,5000, 9  0
144,240,1200,2300,3000,4600,5000, 9  0           150,240,1200,2300,3000,4600,5000, 9  0
144,240,1200,2300,3000,4600,5000, 9  0           144,240,1200,2300,3000,4600,5000, 9  0
135,240,1200,2300,3000,4600,5000, 9  0           150,240,1200,2300,3000,4600,5000, 9  0
135,240,1200,2300,3000,4600,5000, 9  0           150,240,1200,2300,3000,4600,5000, 9  0
135,240,1200,2300,3000,4600,5000, 9  0           135,240,1200,2300,3000,4600,5000, 9  0
135,240,1200,2300,3000,4600,5000, 9  0           135,240,1200,2300,3000,4600,5000, 9  0
                                                 135,240,1200,2300,3000,4600,5000, 9  0
                                                 135,240,1200,2300,3000,4600,5000, 9  0
                                                 ****************************************

****************************************        ****************************************
BEFORE                                           AFTER
****************************************        ****************************************
F0  F1   F2   F3   F4   F5   FH   A0  AN         F0  F1   F2   F3   F4   F5   FH   A0  AN
****************************************        ****************************************
```

| | | | |
|---|---|---|---|
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 148,210,1500,2500,3000,4500,5000,10 | 0 |
| 148,210,1500,2500,3000,4500,5000,10 | 0 | 149,210,1500,2500,3000,4500,5000, 0 | 9 |
| 148,210,1500,2500,3000,4500,5000, 0 | 9 | 149,210,1500,2500,3000,4500,5000, 0 | 9 |
| 148,210,1500,2500,3000,4500,5000, 0 | 9 | 150,210,1500,2500,3000,4500,5000, 0 | 9 |
| 148,210,1500,2500,3000,4500,5000, 0 | 9 | 150,210,1500,2500,3000,4500,5000, 0 | 9 |
| 148,210,1500,2500,3000,4500,5000, 0 | 9 | 149,210,1500,2500,3000,4500,5000, 0 | 9 |
| 148,210,1500,2500,3000,4500,5000, 0 | 9 | | |

***************************************  ***************************************

Start of phoneme - E-                        Start of phoneme - E-

| | | | |
|---|---|---|---|
| 148,210,1500,2500,3000,4500,5000, 9 | 0 | 148,240,1200,2300,3000,4600,5000, 9, | 0 |
| 148,240,1200,2300,3000,4600,5000, 0 | 0 | 147,240,1200,2300,3000,4600,5000, 9, | 0 |
| 150,240,1200,2300,3000,4600,5000, 0 | 0 | 146,240,1200,2300,3000,4600,5000, 9, | 0 |
| 150,240,1200,2300,3000,4600,5000, 0 | 0 | 145,240,1200,2300,3000,4600,5000, 9, | 0 |
| 151,240,1200,2300,3000,4600,5000, 0 | 0 | 144,240,1200,2300,3000,4600,5000, 9 | 0 |
| 151,240,1200,2300,3000,4600,5000, 0 | 0 | 143,240,1200,2300,3000,4600,5000, 9 | 0 |
| 151,240,1200,2300,3000,4600,5000, 0 | 0 | 142,240,1200,2300,3000,4600,5000, 9 | 0 |
| 144,240,1200,2300,3000,4600,5000, 0 | 0 | 141,240,1200,2300,3000,4600,5000, 9 | 0 |
| 144,240,1200,2300,3000,4600,5000, 0 | 0 | 140,240,1200,2300,3000,4600,5000, 9 | 0 |
| 144,240,1200,2300,3000,4600,5000, 0 | 0 | 139,240,1200,2300,3000,4600,5000, 9 | 0 |
| 135,240,1200,2300,3000,4600,5000, 0 | 0 | 138,240,1200,2300,3000,4600,5000, 9 | 0 |
| 135,240,1200,2300,3000,4600,5000, 0 | 0 | 137,240,1200,2300,3000,4600,5000, 9 | 0 |
| 135,240,1200,2300,3000,4600,5000, 0 | 0 | 136,240,1200,2300,3000,4600,5000, 9 | 0 |
| 135,240,1200,2300,3000,4600,5000, 0 | 0 | 135,240,1200,2300,3000,4600,5000, 9 | 0 |

***************************************  ***************************************

The following comprise a set of pseudo code structures which may be used in the transition contouring module of the present invention.

```
Data Structure:
Consonant_Matrix = consonant values with associated initial
and final vowel frequencies.
Intonation = {new_intonation_pattern|old_intonation_pattern}
        where patterns are periodic fundamental sine wave
        in Hz.
Vowel = {vowel_freq|vowel_freq2|original_vowel_freq} where
        vowels are specific f0 values in Hz.
Consonant = {voiced|unvoiced} where consonants are specific
        frequencies in Hz.
```

```
Prosody Grammar: I = V*C*V' where I is the input string
occurring
        with C (consonant), which also occurs with left
        context V (preceding vowel) and right context
V'
        (succeeding vowel).
Input String: I ' (C)(V)(C')(V)(C)(V)(C')(C)(V)(C')(V).
```

Flow Chart (top-level):
Initialization:

```
initialize speech parameters()
Speech Buffer Queue
```

```
If Speech Buffer is not empty and phonemic representation is
    passed as input then
        Call Prosody_rules
        Select vowel from Intonation
            Call Consonant_rules
            Select consonant from Consonant_Matrix
```

```
END If
Speech Output
```

```
If Speech Buffer is not empty then
     Send Intonation (assigned f0 values) to next (input) module
     Send to (output) port on Speech Synthesizer
END If
```

The following pseudo code illustrates a main entry point into transitional boundary conditions of the algorithmic technique for intonational contours.

```
Main ()
{
     initialize speech_parameters();
     if (new_intonation_pattern != old_intonation_pattern)
     /* call prosody rules */
     Prosody_rules(new_intonation_pattern,old_intonation_
               pattern,f0);
} /* end of main */
```

This procedure determines intonation patterns and calls lower level routine for phoneme transitions.

```
Procedure Prosody_rules(new_intonation_pattern,old_intonation_
                    pattern, f0);
{
     if (new_intonation_pattern == consonant && vowel_freq)
and
     (vowel_freq <= old_intonation_pattern)
     /* call rules for voiced and unvoiced consonants */
     Consonant_rules(consonant,vowel_freq.vowel_freq2);
     f0 := vowel_freq2:
     output(f0);
     else
     if (new_intonation_pattern == vowel_freq && consonant)
and
     (vowel_freq => old_intonation pattern)
     /* call rules for voiced and unvoiced consonants */
     Consonant_rules(consonant,vowel_freq,vowel_freq2);
     f0 := vowel freq2;
     output(f0);
     else
     /* frequency of vowel remains unchanged */
     f0 := vowel_freq2;
     output(f0);
} /* end of Prosody_rules */
```

This procedure determines and applies frequency values to smooth the transitions between phoneme to phoneme according to the consonant phonemes adjacent to the transition.

```
/* example of consonant rules */
Procedure Consonant_rules(consonant,vowel_freq,vowel_freq2);
{
     /* for S-rule */
     if (consonant == 's' && vowel_freq < original_vowel_freq)
          vowel_freq2 := original_vowel_freq + 7 Hz;
     else
     if (consonant == 's' && vowel_freq > original_vowel_freq)
```

```
        vowel_freq2 := original_vowel_freq + 7Hz;
    else
        null;
    /* for N-rule */
    if (consonant == 'n' && vowel_freq < original_vowel_freq)
        vowel_freq2 := original_vowel_freq + 6 Hz;
    else
    if (consonant == 'n' && vowel freq > original_vowel_freq)
        vowel_freq2 := original_vowel_freq + 5 Hz;
    else
        null;
    /* Note: similar logic, but with remaining consonants */
    /*       and different Hz values.                    */
} /* end of Consonant_rules */
```

While the invention has been described with respect to particular embodiments above, it will be understood by those skilled in the art that modifications may be made without departing from the skill and scope of the present invention. These embodiments are for purposes of example and illustration only and are not to be taken to limit the scope of the invention narrower than the scope of the appended claims.

I claim:

1. A method of operating a speech synthesis system comprising the steps of:

generating a string of linguistic units containing pitch data by selecting linguistic units from a first memory segment of the system which correspond to characters in a text string and concatenating the selected linguistic units together in a second memory segment of the system;

selecting locations within the pitch data of the string of linguistic units;

retrieving a first set of dialect intervals for a first selected dialect, the first set of dialect intervals selected from a set of melodic intervals as being indicative of the first selected dialect and stored in a dialect table in a third memory segment of the system; and applying the first set of dialect intervals to the pitch data at the selected locations so that synthesized speech of the first selected dialect produced.

2. The method as recited in claim 1 wherein the applying step comprises changing at least one interval at a selected location in the pitch data to at least one dialect interval of the first set of dialect intervals.

3. A method of operating a speech recognition system comprising the steps of:

providing a digitized speech sample of human speech;

selecting a set of melodic intervals in the digitized speech sample;

retrieving a first set of dialect intervals for a first selected dialect, the first set of dialect intervals being melodic intervals which are indicative of the first selected dialect and stored in a dialect table; and comparing the set of melodic intervals to the first set of dialect intervals to determine whether the digitized speech sample is from human speech of the first selected dialect.

4. The method as recited in claim 3 which further comprises the step of sending a message to the user interface of the system if there is a match between the set of melodic intervals and the first set of dialect intervals.

5. The method as recited in claim 3 which further comprises the steps of:

retrieving a second set of dialect intervals for a second selected dialect;

comparing the set of melodic intervals to the second set of dialect intervals to determine whether the digitized speech sample is from human speech of the second selected dialect; and, sending a message to a user interface of the system indicating that there is a match between the set of melodic intervals and the second set of dialect intervals.

6. The method as recited in claim 3 wherein the selecting step comprises identifying a melodic interval in the digitized speech sample which exceeds a predetermined threshold as a melodic interval in the set of melodic intervals.

7. The method as recited in claim 3 which further comprises the steps of:

comparing the digitized speech sample with a code book which contains stored speech samples corresponding to phonemes to generate a string of phonemes corresponding to the digitized speech sample; and comparing the digitized speech sample to pitch data in the string of phonemes to select the set of melodic intervals.

8. The method as recited in claim 3 wherein the selecting step comprises the steps of:

analyzing the digitized speech sample to generate prosodic data; and, selecting the set of melodic intervals according to the prosodic data.

9. The method as recited in claim 1 wherein the dialect table includes sets of dialect intervals for a plurality of dialects.

10. The method as recited in claim 1 wherein the dialect table includes a set of dialect intervals for a first language.

11. The method as recited in claim 9 wherein the sets of dialect intervals are based on the diatonic scale.

12. The method as recited in claim 1 which further comprises the steps of:

generating prosody data for the string of linguistic units according to prosody rules of the system; and altering the pitch data within the string of linguistic units according to the prosody data;

wherein the selected locations are chosen within the altered pitch data.

13. The method as recited in claim 1 which further comprises the steps of:

selecting a set of keywords located in the text string; and locating a set of locations which correspond to the keywords in the string of linguistic units;

wherein the selected locations are selected according to locations in the pitch data which correspond to the locations of the set of keywords in the text string.

14. The method as recited in claim 2 which further comprises the steps of:
- retrieving a second set of dialect intervals for a second selected dialect, the second set of dialect intervals selected from a set of melodic intervals as being indicative of the second selected dialect stored in the dialect table; and
- changing at least one melodic interval at a selected location in the pitch data to one of the second set of dialect intervals to produce synthesized speech of the second selected dialect.

15. The method as recited in claim 5 which further comprises the steps of:
- determining a probability of match for the first and second selected dialects; and,
- sending a message to a user interface indicating the probability that the string of linguistic units represents speech of the first or second dialect.

16. The method as recited in claim 1 wherein the first dialect is British English and the first set of dialect intervals comprises an octave, a major seventh and a minor seventh.

17. The method as recited in claim 1 wherein the first dialect is a Japanese and the first set of dialect intervals comprises a perfect fifth, a perfect fourth, a major second and a minor second.

18. The method as recited in claim 1 wherein the first dialect is Irish and the first set of dialect intervals comprises a major sixth, a minor sixth and a major third.

19. The method as recited in claim 1 wherein the first dialect is Midwestern English and the first set of dialect intervals comprises a perfect fifth, a major third, a perfect fourth and a minor third.

20. A computer program product on a computer readable medium for speech synthesis, the computer program product executable in a computer system comprising:
- program code means for generating a string of linguistic units containing pitch data by selecting linguistic units from a first memory segment of the system which correspond to characters in a text string and concatenating the selected linguistic units together in a second memory segment of the system;
- program code means for selecting locations within the pitch data of the string of linguistic units;
- program code means for retrieving a first set of dialect intervals for a first selected dialect, the first set of dialect intervals selected from a set of melodic intervals as being indicative of the first selected dialect stored in a dialect table in a third memory segment of the system; and
- program code means for applying the first set of dialect intervals to the set of melodic intervals.

21. The product as recited in claim 20 wherein the applying means changes at least one melodic interval at a selected location in the pitch data to at least one, dialect interval of the first set of dialect intervals.

22. A computer program product in a computer readable medium for speech recognition, the computer program product executable in a computer system, comprising:
- program code means for providing a digitized speech sample of human speech;
- program code means for selecting a set of melodic intervals in the digitized speech sample;
- program code means for retrieving a first set of dialect intervals for a first selected dialect, the first set of dialect intervals being melodic intervals which are indicative of the first selected dialect and stored in a dialect table in a third memory segment of the system; and
- program code means for comparing the set of melodic intervals to the first set of dialect intervals to determine whether the digitized speech sample is from speech of the first selected dialect.

23. The product as recited in claim 22 which further comprises program code means for sending a message to a user interface of the system if there is a match between the set of melodic intervals and the first set of dialect intervals.

24. The product as recited in claim 22 which further comprises:
- program code means for retrieving a second set of dialect intervals for a second selected dialect;
- program code means for comparing the set of melodic intervals to the second set of dialect intervals to determine whether the digitized speech sample is from human speech of the second selected dialect; and,
- program code means for sending a message to a user interface of the system indicating that there is a match between the set of melodic intervals and the second set of dialect intervals.

25. The product as recited in claim 22 which further comprises:
- program code means for comparing the digitized speech sample with a code book which contains stored speech samples corresponding to phonemes to generate a string of phonemes corresponding to the digitized speech sample; and
- program code means for comparing the digitized speech sample to pitch data in the string of phonemes to select the set of melodic intervals.

26. The product as recited in claim 22 wherein the selecting means comprises:
- program code means for analyzing the digitized speech sample to generate prosodic data; and,
- program code means for selecting the melodic intervals according to the prosodic data.

27. The product as recited in claim 21 wherein the identifying means comprises:
- program code means for generating prosody data for the string of linguistic units according to prosody rules of the system; and
- program code means for altering the pitch data within the string of linguistic units according to the prosody data;
- wherein the selected locations are chosen within the altered pitch data.

28. A speech synthesis system comprising:
- a memory for storing set of instructions to perform speech processing and speech data;
- a processor coupled to the memory for executing the sets of instructions;
- means for generating a string of linguistic units containing pitch data by selecting dialect neutral linguistic units from a first memory segment of the system which correspond to characters in a text string and concatenating the selected linguistic units together in a second memory segment of the system;
- means for selecting locations within the pitch data of the string of linguistic units;
- means for retrieving a first set of dialect intervals for a first selected dialect, the first set of dialect intervals selected from a set of melodic intervals as being indicative of the first selected dialect and stored in a dialect table in a third memory; and means for applying the first set of dialect intervals to the pitch data at the selected locations so that synthesized speech of the first selected dialect produced.

29. The system as recited in claim 28 wherein the applying means changes at least one melodic interval at a selected location in the pitch data to at least one dialect interval of the first set of dialect intervals.

30. A speech recognition system comprising:

a memory for storing set of instructions to perform speech processing and speech data;

a processor coupled to the memory for executing the sets of instructions;

means for providing a digitized speech sample of human speech;

means for selecting a set of melodic intervals in the digitized speech sample;

means for retrieving a first set of dialect intervals for a first selected dialect, the first set of dialect intervals being melodic intervals which are indicative of the first selected dialect and stored in a dialect table; and means for comparing the set of melodic intervals to the first set of dialect intervals to determine whether the digitized speech sample is from human speech of the first selected dialect.

31. The system as recited in claim 30 which further comprises means for sending a message to a user interface of the system if there is a match between the set of melodic intervals and the first set of dialect intervals.

32. The system as recited in claim 30 which further comprises:

means for retrieving a second set of dialect intervals for a second selected dialect;

means for comparing the set of melodic intervals to the second set of dialect intervals to determine whether the digitized speech sample is from human speech of the second selected dialect; and, means for sending a message to a user interface of the system indicating that there is a match between the set of melodic intervals and the second set of dialect intervals.

33. The system as recited in claim 30 wherein the selecting means identifies a melodic interval in the digitized speech sample which exceeds a predetermined threshold as a melodic interval in the set of melodic intervals.

34. The system as recited in claim 30 wherein the selecting means comprises:

means for comparing the digitized speech sample with a code book which contains stored speech samples corresponding to phonemes to generate a string of phonemes corresponding to the digitized speech sample; and means for comparing the digitized speech sample to pitch data in the string of phonemes to select the set of melodic intervals.

35. The system as recited in claim 30 wherein the identifying means comprises:

means for analyzing the digitized speech sample to generate prosodic data; and, means for selecting the set of melodic intervals according to the prosodic data.

36. The system as recited in claim 28 wherein the dialect table includes sets of dialect intervals for a plurality of dialects.

37. The system as recited in claim 28 wherein the dialect table includes a set of dialect intervals for a first language.

38. The system as recited in claim 29 wherein the identifying means comprises:

means for generating prosody data for the string of linguistic units according to prosody rules of the system; and means for altering the pitch data within the string of linguistic units according to the prosody data;

wherein the selected locations are chosen within the altered pitch data.

39. The system as recited in claim 28 wherein the first dialect is British English and the first set of dialect intervals comprises an octave, a major seventh and a minor seventh.

40. The system as recited in claim 28 wherein the first dialect is Japanese and the first set of dialect intervals comprises a perfect fifth, a perfect fourth, a major second and a minor second.

41. The system as recited in claim 28 wherein the first dialect is Irish and the first set of dialect intervals comprises a major sixth, a minor sixth and a major third.

42. The system as recited in claim 28 wherein the first dialect is Midwestern English and the first set of dialect intervals comprises a perfect fifth, a major third, a perfect fourth and a minor third.

* * * * *